United States Patent [19]

Karbacher

[11] Patent Number: 5,094,676
[45] Date of Patent: Mar. 10, 1992

[54] FILTER/FAN ASSEMBLY

[76] Inventor: Michael H. Karbacher, 1107 S. Flower St., Burbank, Calif. 91502

[21] Appl. No.: 518,664

[22] Filed: May 3, 1990

[51] Int. Cl.$^5$ .............................................. B01D 50/00
[52] U.S. Cl. ..................................... 55/316; 55/385.1; 55/473; 55/494; 55/495; 416/146 R
[58] Field of Search ..................... 55/316, 385.1, 473, 55/494, 495, 515, 516; 416/146 R, 247 R

[56] References Cited

U.S. PATENT DOCUMENTS

| | | | |
|---|---|---|---|
| 3,082,587 | 3/1963 | Brimberg | 55/495 |
| 3,422,263 | 1/1969 | Asahina | 55/316 |
| 3,516,232 | 6/1970 | Gilbertson | 416/146 R |
| 3,608,278 | 9/1971 | Greenspan | 55/428 |
| 4,385,911 | 5/1983 | Popeil et al. | 55/316 |
| 4,411,675 | 10/1983 | de Castella | 55/316 |
| 4,514,197 | 4/1985 | Armbruster | 55/316 |
| 4,662,912 | 5/1987 | Perkins | 55/316 |
| 4,750,863 | 6/1988 | Scoggins | 55/385.2 |

Primary Examiner—Jay H. Woo
Assistant Examiner—C. Scott Bushey
Attorney, Agent, or Firm—Wagner & Middlebrook

[57] ABSTRACT

A filter and fan assembly utilizes a conventional ceiling fan having a motor and an upstanding tubular member above the motor which carries electrical wires to the motor. A collar concentrically positioned on the tubular member includes radially extending support members, each of which supports a radially extending horizontal arm. At the end of each such arm is attached, a vertically extending support member. A shallow cylindrical shroud is carried on the vertically extending support members, with the shroud extending a limited distance above the radially extending arms. A plurality of trays having porous bottoms are supported on the arms and contain a filter medium including a layer of activated charcoal granules covered by a membrane of polyester filaments. A second embodiment utilizes a split collar which is bolted around the upstanding tubular member. The fan is normally operated to pull air downwardly through the filter medium.

15 Claims, 4 Drawing Sheets

FILTER/FAN ASSEMBLY

BACKGROUND OF THE INVENTION

This invention relates to a filter and fan assembly which is positioned and operated to replace a conventional ceiling fan or to a filter assembly operable with an existing ceiling fan.

Air pollution, dust, vehicle emissions, cooking odors and other pollutants tend to be at the least, unpleasant, and sometimes interfere with the pleasure or performance of those working in the immediate area. While air conditioners operated in hot weather usually include filters to remove dust and other particulates from the air, it has not been usual to incorporate filters in ceiling fans. Applicant is aware of U.S. Pat. No. 4,750,863 which shows such a combination although a number of details of construction are more complicated and more expensive to produce than in the case of Applicant's assembly described herein. Other patents having some similar features are U.S. Pat. No. 4,385,911 which shows a floor mounted fan in portable enclosure which includes a foam filter layer and a layer of activated charcoal, with the fan pulling the air across the two layers, U.S. Pat. No. 4,676,721 which discloses a ceiling fan having removable sleeves over the blades which collect dust; and U.S. Pat. No. 4,064,027 which shows a ceiling fan having a cylindrical shroud supporting a plurality of light fixtures.

It is, therefore, an object of the present invention to provide a filter and ceiling fan assembly of the type described which is simple in construction and inexpensive to produce.

It is another object of the present invention to provide a filter and fan assembly of the type described in which replacement of the filter medium is convenient and inexpensive.

It is further object of the present invention to provide a filter assembly usable with an existing ceiling fan and which meets the above objections and which can be made reasonably attractive in appearance.

Other objects and advantages will become apparent from the following description taken in connection with the accompanying drawings.

DESCRIPTION OF THE PREFERRED EMBODIMENT

Figure 1:
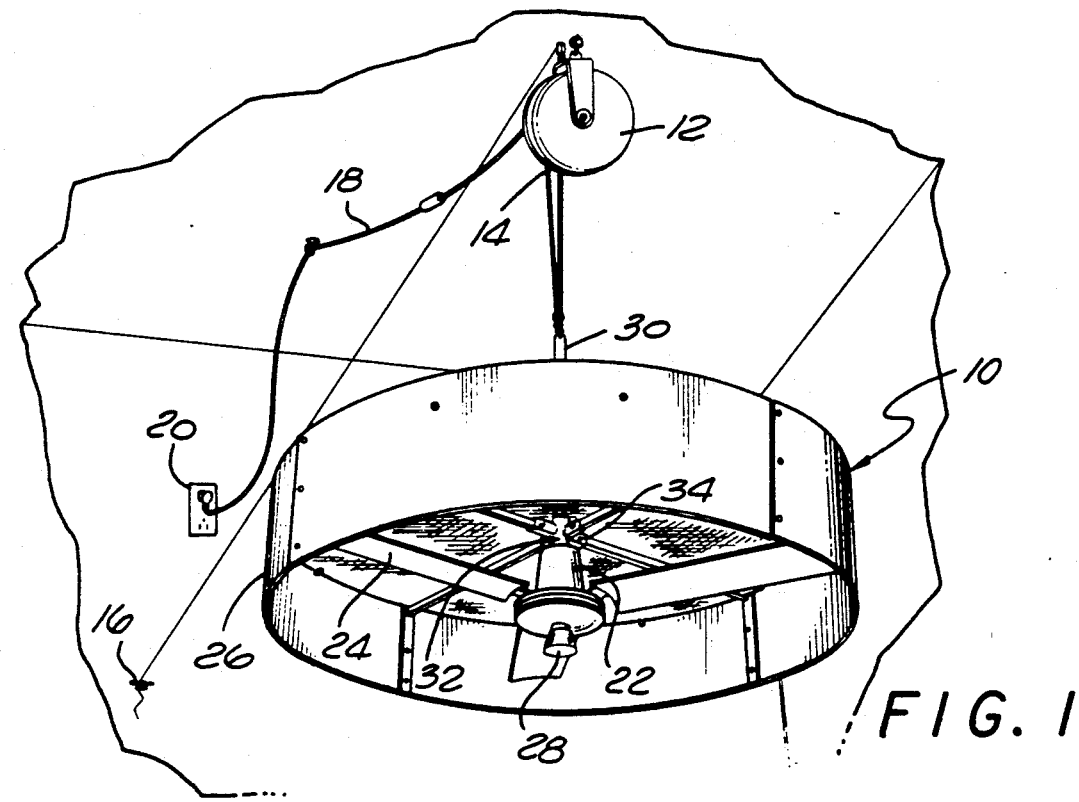
FIG. 1 is a bottom perspective view of the filter and fan assembly of the present invention.

Referring now to FIG. 1, a filter and fan assembly 10 is shown suspended from a ceiling by means of a pulley structure 12 which includes a support line 14 carrying the weight of the assembly 10. Line 14, in addition to being carried on the pulley structure 14 is removably secured to anchoring means 16 on an adjacent wall. A separate electrical conductor 18 shown plugged into a conventional wall outlet 20 is, or may be, carried on the pulley structure and fastened to the fan motor 22 forming part of assembly 10. Motor 22 drives a plurality of fan blades 24 which rotate within a shroud 26. A switch 28 connected to motor 22 can be used to vary the fan speed and direction of rotation as is well known in the art.

Figure 2:
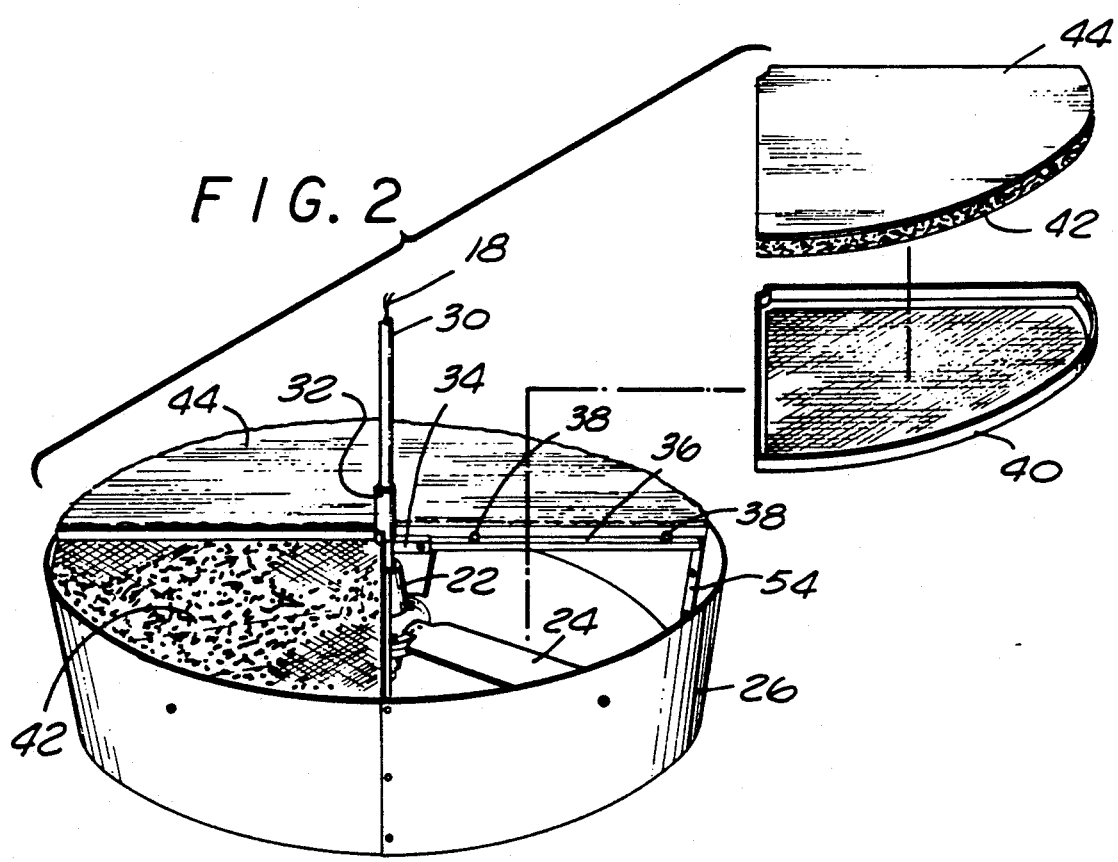
FIG. 2 is a top perspective view of the assembly of FIG. 1 with certain filter parts removed.

FIG. 2 is a perspective view of the filter and fan assembly 10 as seen from the top. Fan motor 22 and a blade 24 are shown within shroud 26. An upstanding tubular member 30 carried on the housing of motor 22 carries electrical wires 18 to the motor which is also connected to support line 14. Carried on and concentric with tubular member 30 is a sleeve member 32 having four radially extending hollow arms 34 of square cross section. Inserted into each of these arms 34 is a square cross section shaft 36, each of which carries centered on its top surface, a pair of upstanding tabs 38. Supported on each of the shafts 36 and located by tabs 38 are four shallow filter trays 40, each occupying approximately one quarter of the circular area surrounded by shroud 26. The trays have fine openings on their bottom surface to permit the passage of air but which support a layer 42 of granules of activated charcoal. Such granules are typically ½ inch long by 3/16 inch diameter. The trays 40 typically consist of a metal frame and having a supporting surface of expanded metal or screen although they could also be of molded plastic. The size of the perforations or openings in the supporting surface may vary depending on the size of the activated charcoal granules to be retained. Resting in each tray over the charcoal layer 42 is a porous polyester filament membrane 44 which serves to hold the charcoal in place and as a pre-filter.

Figure 3:
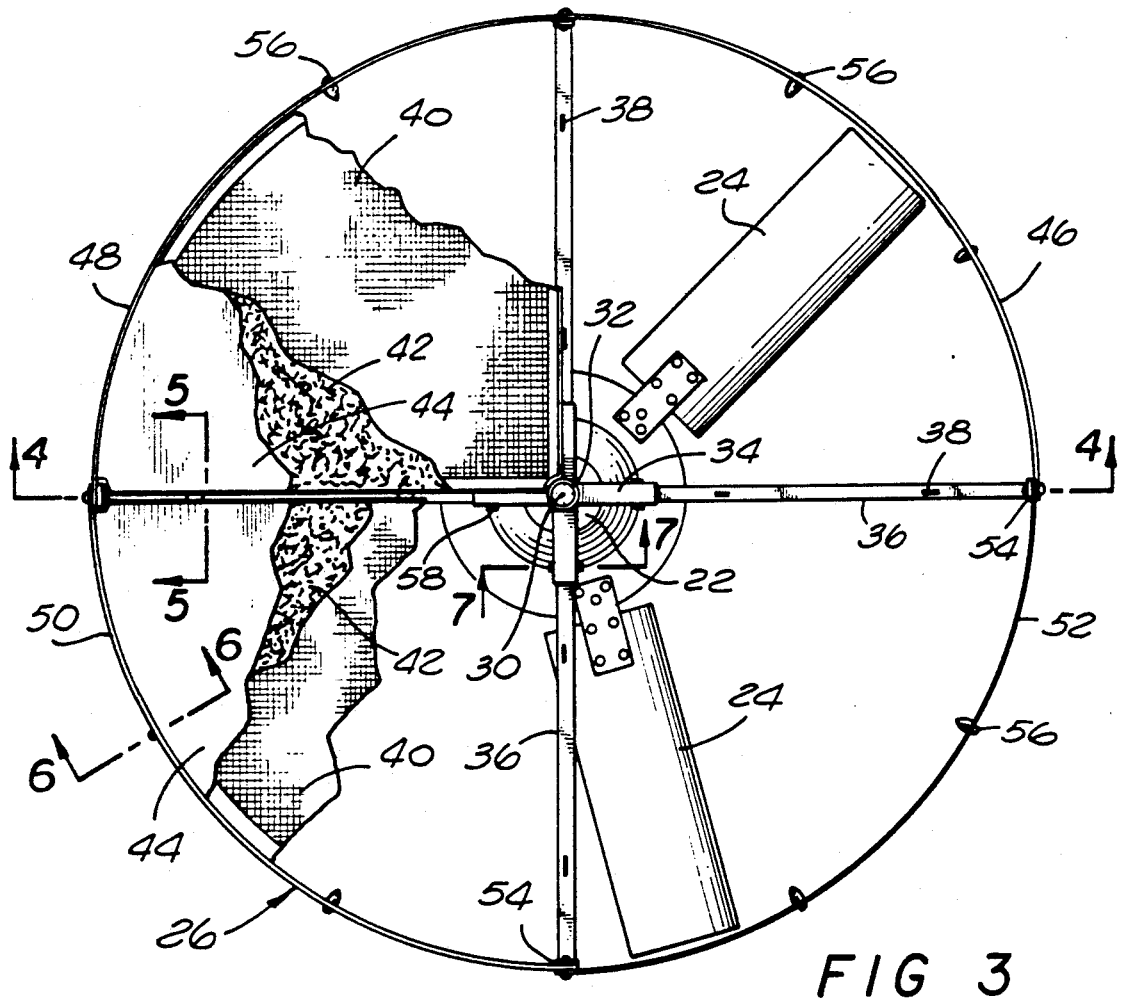
FIG. 3 is a plan view of the assembly of FIGS. 1 and 2 with portions of the filter parts removed and other parts shown broken away to show details of the filter construction.

FIG. 3 is a view of the filter and fan assembly 10 as seen from the top with the filter trays 40 removed from the right side and with portions of the filter structure shown broken away on the left side. The left upper and lower quadrants show portions of the filter trays 40, part of which is covered with the charcoal granule layer 42. A portion of each of the membranes 44 is shown overlying part of the charcoal granule layer 42. Each quarter of the shroud 26 is a separate rectangular piece of sheet metal, the separate sheets carrying numerals 46, 48, 50 and 52. Fastened to the outboard ends of each of the shafts 36 are vertical support members 54. Each of shroud sheets 46, 48, 50 and 52 are fastened at each end to one of members 54. Located at approximately thirty degree intervals along the sheets 46, 48, 50 and 52 and spaced from the vertical supports 54 are a plurality of small supports 56 which may consist of a screw and a rubber grommet which are located at a height on the shroud to support the arcuate edges of the filter trays 40. It has been found useful to include these supports and to make their points of contact with the trays 40 of a resilient material to minimize a tendency of the filter trays to resonate with the motion of the fan and motor. Applicant has formed sheets 46, 48, 50 and 52 of a lightweight sheet aluminum which easily conforms to the desired arcuate configuration and adds relatively little loading to the structure. It will be obvious to those skilled in the art that a suitable plastic material could also be used for this purpose, in which case support members 56 could be integrally formed with the shroud sheets.

Figure 4:
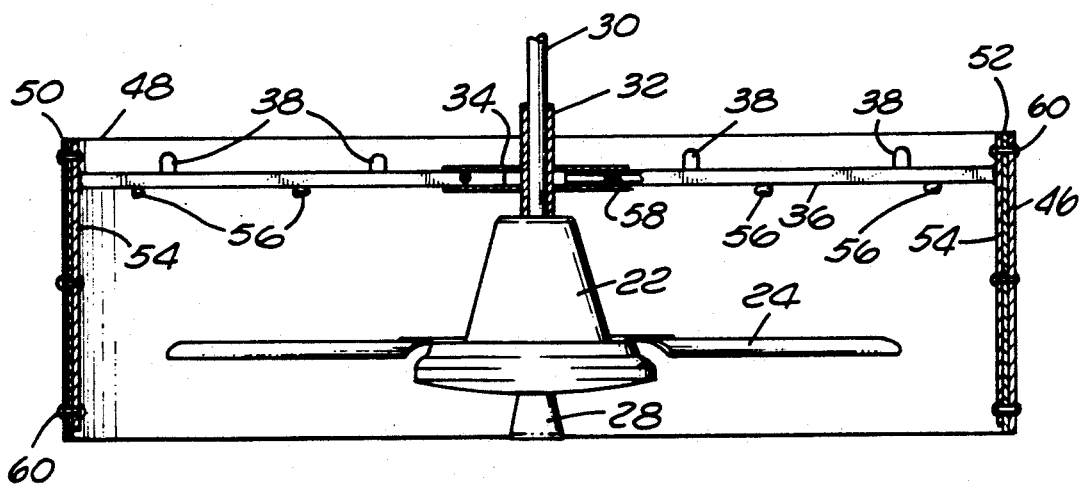
FIG. 4 is a sectional view, taken along lines 4—4 of the filter and fan assembly of FIG. 3 the filter structure and with the filter structure and portions of the fan shroud removed.

FIG. 4 is a cross sectional view taken along lines 4—4 of FIG. 3 with the filter trays removed. Visible in this view are fan motor 22 with fan blades 24, switch 28, tubular support member 30, sleeve 32 with arms 34, shafts 36 secured in arms 34 as with screws 58, vertical supports 54 to which are attached shroud sheets 46, 48, 50 and 52 by any suitable means such as rivets 60. The tabs 38 on the top surface of shafts 36 and support members 56 are also shown.

Figure 5:
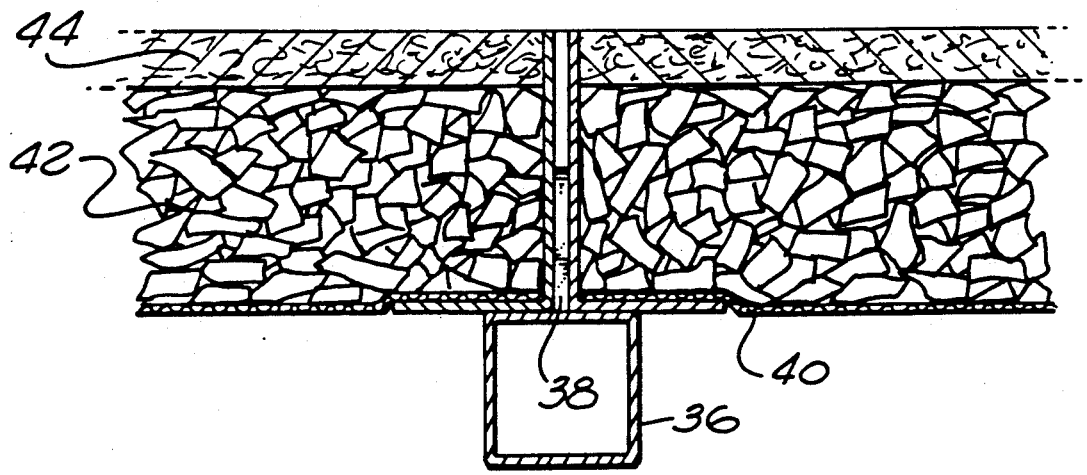
FIG. 5 is a sectional view of a portion of the filter and fan assembly taken along lines 5—5 of FIG. 3.
Figure 6:
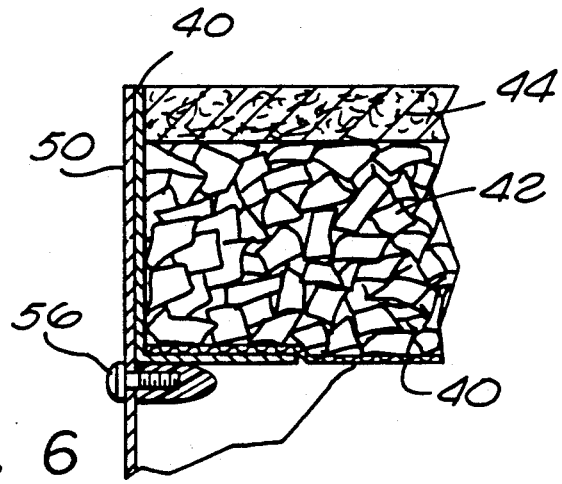
FIG. 6 is a sectional view taken along lines 6—6 of FIG. 3.
Figure 7:
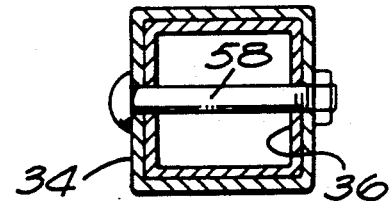
FIG. 7 is a sectional view taken along lines 7—7 of FIG. 3.

Additional detail showing the manner in which the filter trays 40 are supported on shafts 38 appears in FIG. 5 which is a cross sectional view taken along line 5—5 of FIG. 3. Shown in this view is a cross section of shaft 36 and a tab 38. Two trays 40 rest on the top of shaft 36, spaced and located by tab 38. FIG. 6 is a cross sectional view taken along line 6—6 of FIG. 3. In this view, the filter tray 40 is shown supported by one of the supports 56 which is carried in shroud sheet 50. FIG. 7 is a cross sectional view taken along line 7—7 of FIG. 3 and shows the shaft 36 secured in arm 34 by means of screw 58. Each of arms 34 and shafts 36 are of square cross section. The primary purpose for using the square cross section members is to provide a flat surface at the top to support filter trays 40. Other cross sections could be used, but the material having the square cross section is available and convenient.

Figure 8:
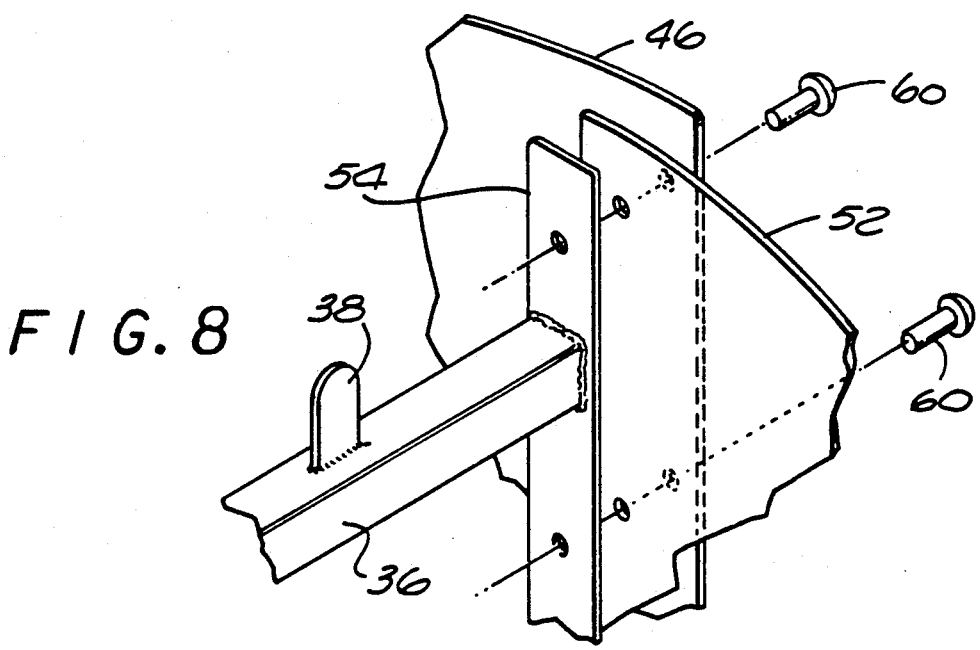
FIG. 8 is an enlarged fragmentary perspective drawing of a portion of the filter support and shroud mounting means of the filter and fan assembly of FIGS. 1–7.

FIG. 8 is an enlarged fragmentary perspective drawing of a portion of the filter support and shroud mounting means. A vertical support member 54 is welded or otherwise suitably fastened to the outboard end of one of the shafts 36. An upstanding tab 38 is shown attached to the center of the top surface of shaft 36. Two of the shroud sheets 46 and 52 are shown in exploded configuration but overlapping and having screw holes aligned with similar holes on vertical support member 54. From this view it will be clear that the ends of shroud sheets 46 and 52 are fastened to vertical support member 54 by means of suitable rivets or screws 60.

Figure 9:
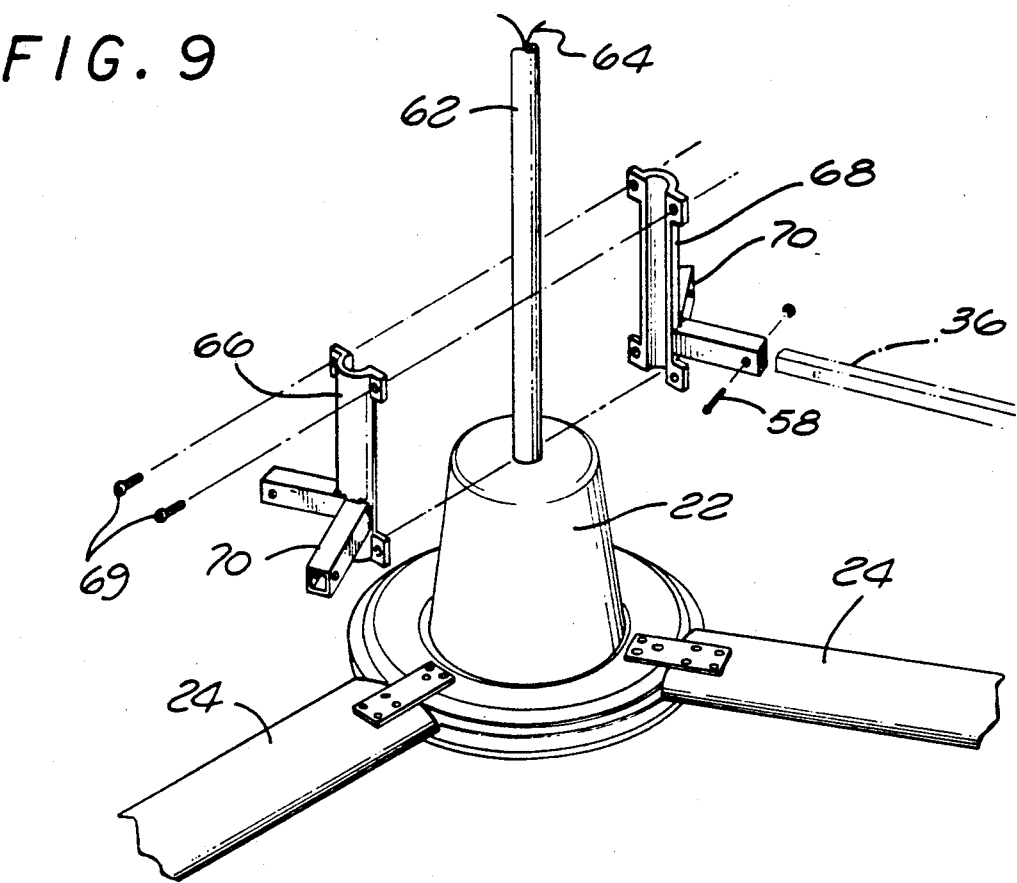
FIG. 9 is a fragmentary perspective view of an alternative embodiment of my invention.
Figure 10:
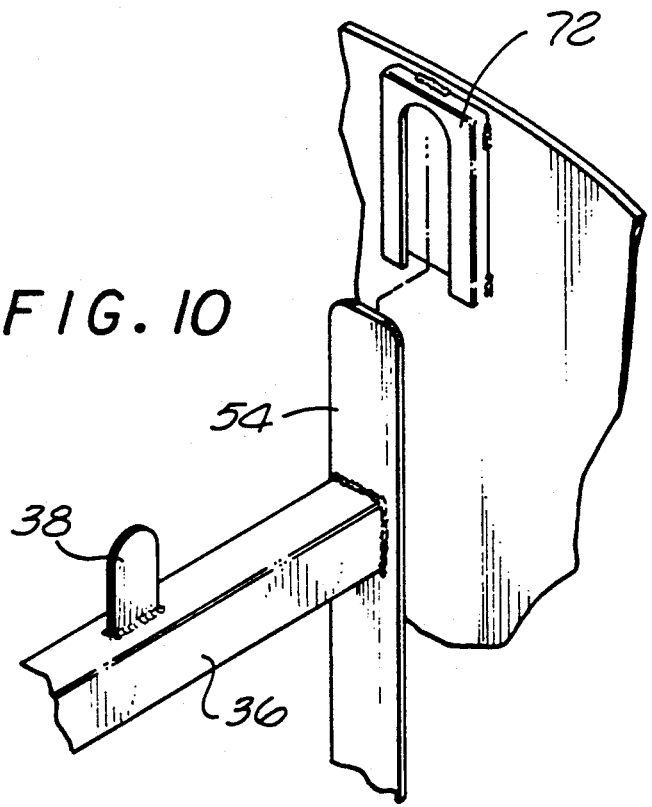
FIG. 10 is an enlarged fragmentary perspective view of a portion of an alternative filter support and shroud mounting means.

In some cases it may be desired to install my filter and fan shroud assembly on an existing ceiling fan which is suspended from the ceiling by means of a hollow rod which conventionally carries the electric power wires to the fan motor. The assembly is then modified slightly to permit it to be installed around the fan and rod without disassembling the fan from the ceiling. This may be accomplished through use of the structure shown in FIG. 9 which portrays a second embodiment of my invention. FIG. 9 is a fragmentary perspective view showing the fan motor 22 and the fan blades 24 which are suspended from the ceiling by means of a hollow rod 62 carrying electric wires 64. In this embodiment, the sleeve is split into two halves 66 and 68 which may be bolted together around rod 62 by means of screws 69, each half carrying two of the radially extending arms 70. Each of the arms 70 receives one of the shafts 36 as described above. In other respects, the assembly is, or may be, as described above. Where it is desired that the shroud be particularly decorative, it may be preformed without seams but with internal slots 72 as shown in FIG. 10 or other suitable means for attachment to the vertical support members 54. Alternatively, the shroud may be formed in a single strip of material including similar means for attachment to support members 54 in which case there will be a single overlapping seam at one such support. Or it may be formed of two strips with internal properly located means such as slots 70 for attachment to every other vertical support member 54, in which case there will be seams at two such supports 54.

From the foregoing it will be apparent that there are a number of advantages inherent in Applicant's design. The entire unit is easy to fabricate and assemble. The materials used are comparatively inexpensive and readily available. The pulley suspension arrangement makes it easy to lower the entire unit to a level where removal and replacement of the filter elements is facilitated. The carbon granules are inexpensive and readily available and are simply poured into the trays and levelled to a desired depth which may be varied as experience shows to be expedient. There is no need for special and expensive filter elements. The polyester membrane may be washed to remove adhering dust, etc., and/or replaced as needed. And where it is desired to add the filter unit to an existing ceiling fan, the embodiment of FIGS. 9 and 10 makes it possible to accomplish this without disconnecting the fan from its supporting rod or other support means or from the ceiling. It is, of course, intended that the fan be operated to pull the air in a downward direction which will cause the charcoal granules to be firmly retained in the trays. Operation in the opposite direction can be done but would require additional retaining means such as screen members on the tops of the trays.

While only two embodiments have been shown and described in detail herein, modifications will be apparent to those skilled in the art. Applicant has fabricated his shroud sheets of aluminum, but it is clear these members could also be of plastic. Applicant's filter trays 40 are described as being of metal but could as well be of a suitable plastic material. Sleeve 32 and arms 34 could be a single molded member if formed of a reasonably strong plastic material. Sleeve halves 66 and 68 and arms 70 could also be molded of strong plastic. Other modifications will become apparent and I do not desire to be limited other than by the appended claims as they may be interpreted with the benefit of the doctrine of equivalents.

What is claimed is:

1. A filter and fan assembly comprising a ceiling fan having a motor and a motor housing, a plurality of blades driven by said motor, a hollow vertical shaft extending above the axis of said fan and attached to said motor housing and electrical wires carried in said hollow vertical shaft connected to said motor;

a concentric sleeve carried on said shaft and a plurality of hollow radially extending supports attached to said sleeve normal to the axis of said shaft;

a plurality of support rods each having a flat upper side of substantial width, one carried in each of said supports, and a flat vertically extending member attached to the outboard end of each of said support rods a small distance outside of said fan blades;

a fan shroud fastened to said vertically extending members;

a plurality of trays each having edges carried on said upper sides of said support rods and having a flat porous bottom to enable the passage of air therethrough;

a filter medium carried in said trays such that when said fan is operated, air containing contaminants is directed through said filter medium; and means attached to said shaft for raising and lowering said assembly to facilitate replacing said filter medium including a pulley and a support line carried on said pulley for carrying the weight of said assembly.

2. A filter and fan assembly as claimed in claim 1 wherein said filter medium includes a layer of granules of activated charcoal.

3. A filter and fan assembly as claimed in claim 2 wherein said layer of granules of activated charcoal are covered with a porous filament membrane of washable polyester material.

4. A filter and fan assembly as claimed in claim 1 wherein additional support means are provided for said trays including a plurality of inwardly extending projections fastened to said shroud between said vertically extending members.

5. A filter and fan assembly as claimed in claim 1 wherein said support rods carry upwardly extending tabs centered on said flat side for locating said trays.

6. A filter and fan assembly as claimed in claim 1 wherein said shroud is formed of a plurality of separate rectangular pieces of aluminum sheet which are fastened to said vertically extending members and bowed to form a cylindrical shroud which is spaced from the ends of said blades.

7. A filter and fan assembly as claimed in claim 4 wherein said inwardly extending projections include rubber sleeve carried on bolts fastened to said shroud and said trays are in part supported on said resilient members.

8. For use with a ceiling fan having a motor and motor housing, a plurality of blades driven by the motor, a hollow vertical shaft extending above the axis of said fan and attached to said motor housing and electrical wires carried in said hollow vertical shaft and connected to said motor;

a filter assembly including a concentric sleeve carried on said shaft and a plurality of hollow radially extending supports attached to said sleeve;

a plurality of support rods each having a flat upper surface, one carried in each of said supports, and a vertically extending member attached to the outboard end of each of said support rods a small distance outside of said fan blades;

a fan shroud fastened to said vertically extending members;

a plurality of trays each having edges carried on the flat upper surface of said support rods and having a flat porous bottom to enable the passage of air therethrough;

a filter medium carried in said trays such that when said fan is operated, air containing contaminants is directed through said filter medium; and means attached to said shaft for raising and lowering said assembly to facilitate replacing said filter medium including a pulley and a support line carried on said pulley for carrying the weight of said assembly.

9. A filter and fan assembly as claimed in claim 8 wherein said concentric sleeve is axially split into two halves and means are provided for fastening said halves together around said shaft.

10. A filter and fan assembly as claimed in claim 9 wherein said fan shroud includes a plurality of internal fastening and support means for supporting said fan shroud on said vertically extending members.

11. A filter and fan assembly as claimed in claim 9 wherein said filter medium comprises a layer containing activated charcoal.

12. A filter and fan assembly comprising a ceiling fan having a motor and motor housing, a plurality of blades driven by said motor, and a shaft attached to said motor housing extending above the fan along its axis;

a concentric sleeve carried on said shaft and a plurality of radially extending supports attached to said sleeve, a plurality of support rods secured to said supports, and a vertically extending member attached to the outboard ends of each of said support rods;

a fan shroud fastened to said vertically extending members;

a plurality of trays each having edges carried on said support rods and having a flat porous bottom to enable the passage of air;

granular filter means carried in said trays; and means attached to said shaft for raising and lowering said assembly to facilitate replacing said filter means;

said raising and lowering means including a pulley and a support line carried on said pulley for carrying the weight of said assembly.

13. A filter and fan assembly as claimed in claim 12 wherein said trays are each generally shaped like the sector of a circle with upwardly extending walls to retain said granular filter means.

14. A filter and fan assembly as claimed in claim 12 wherein said support rods include a flat surface at the top for supporting said trays.

15. A filter and fan assembly as claimed in claim 13 wherein said trays include a layer of loose granules of activated charcoal covered with a porous membrane of washable polyester.

* * * * *